United States Patent [19]

Dapper et al.

[11] Patent Number: 5,606,576
[45] Date of Patent: Feb. 25, 1997

[54] ADAPTIVE MODE CONTROL SYSTEM FOR AM COMPATIBLE DIGITAL BROADCAST

[75] Inventors: Mark J. Dapper, Cincinnati; Michael J. Geile, Loveland; Barry W. Carlin, Greenhills, all of Ohio

[73] Assignee: Northrop Grumman Corporation, Los Angeles, Calif.

[21] Appl. No.: 376,987

[22] Filed: Jan. 23, 1995

[51] Int. Cl.$^6$ ............................. H03C 5/00; H04L 25/03; H04L 25/06; H04L 27/06
[52] U.S. Cl. ..................... 375/268; 375/300; 375/320; 375/340
[58] Field of Search ....................... 375/260, 261, 375/268, 295, 300, 320, 340; 329/347, 349; 332/149, 150, 155; 455/226.1

[56] References Cited

U.S. PATENT DOCUMENTS

| | | | |
|---|---|---|---|
| 5,001,727 | 3/1991 | McDavid | 375/326 |
| 5,195,109 | 3/1993 | Bochmann et al. | 375/100 |
| 5,208,804 | 5/1993 | Wilson | 375/260 |
| 5,214,390 | 5/1993 | Montreuil | 375/328 |
| 5,271,041 | 12/1993 | Montreuil | 375/326 |
| 5,315,617 | 5/1994 | Guida et al. | 375/261 |

Primary Examiner—Wellington Chin
Assistant Examiner—Vijay Shankar
Attorney, Agent, or Firm—Philip A. Florenzo

[57] ABSTRACT

An adaptive mode control system is provided which includes a transmitter including apparatus for inputting format information regarding the waveform structure of an AM compatible digital broadcast signal. The transmitter also includes apparatus for inputting user data such as the information to be broadcast. The transmitter selects the waveform parameters in response to the format information and produces control channel information. The transmitter uses this control channel information in combination with the user data to produce composite data. The transmitter generates an over-the-air signal waveform using the composite data and waveform parameters. Each receiver includes apparatus for detecting the over-the-air signal waveform and composite data generated by the transmitter. The receiver further includes apparatus for parsing the composite data into user data and control channel information. The receiver regenerates the waveform parameters from the control channel information and folds the waveform parameters into the receiver's detection apparatus so that the waveform parameters can reconfigure the receiver for receipt of subsequent transmissions.

7 Claims, 1 Drawing Sheet

ADAPTIVE MODE CONTROL SYSTEM FOR AM COMPATIBLE DIGITAL BROADCAST

BACKGROUND OF THE INVENTION

1. Field of the Invention

This invention relates to radio broadcasting and, more particularly, to methods of and apparatus for adaptively controlling the mode of an amplitude modulated compatible digital broadcast signal.

2. Description of Related Art

There has been increasing interest in the possibility of broadcasting digitally encoded audio signals to provide improved audio fidelity. Several approaches have been suggested. One such approach, set forth in co-pending patent application Ser. No. 08/206,368, filed Mar. 7, 1994, assigned to the assignee hereof, teaches a method for simultaneously broadcasting analog and digital signals in a standard AM broadcasting channel. An amplitude modulated radio frequency signal having a first frequency spectrum is broadcast. The amplitude modulated radio frequency signal includes a first carrier modulated by an analog program signal. Simultaneously, a plurality of digitally modulated carrier signals are broadcast within a bandwidth which encompasses the first frequency spectrum. Each of the digitally modulated carrier signals is modulated by a portion of a digital program signal. A first group of the digitally modulated carrier signals lies within the first frequency spectrum and is modulated in quadrature with the first carrier signal. Second and third groups of the digitally modulated carrier signals lie outside of the first frequency spectrum and are modulated both in-phase and in-quadrature with the first carrier signal. Both transmitters and receivers are provided in accordance with that method.

The waveform in the AM compatible digital audio broadcasting system described in U.S. patent application Ser. No. 08/206,368, filed Mar. 7, 1994, hereby incorporated herein by reference, has been formulated to provide optimal data throughput for the digital signal while avoiding cross talk into the analog AM channel. Multiple carriers are employed by means of orthogonal frequency division multiplexing (OFDM) to bear the communicated information. Because narrowband disturbances in a broadcast area may degrade certain frequencies within the channel, it is desirable to adapt the allocation of digital waveform information across a channel to minimize the effect of such interference.

SUMMARY OF THE INVENTION

The adaptive mode control system of the present invention allows individual broadcasters to tailor a signal to known interference environments in order to enhance the integrity of information transmission. When the format of the transmitted waveform is altered, all receivers must understand the change and adapt their corresponding detection algorithms. The term associated with this process is adaptive mode control.

The adaptive mode control system of the present invention includes a transmitter having means for inputting format information regarding the waveform structure of the AM compatible digital audio broadcast signal. The transmitter also has means for inputting user data such as the information to be broadcast. The transmitter selects the waveform parameters in response to the format information and produces control channel information. The transmitter uses this control channel information in combination with the user data to produce composite data. The transmitter generates an over-the-air signal waveform using the composite data and waveform parameters. Each receiver includes a means for detecting the over-the-air signal waveform and composite data generated by the transmitter. The receiver further includes means for parsing the composite data into user data and control channel information. The receiver regenerates the waveform parameters from the control channel information and folds the waveform parameters into the receiver's detection means so that the waveform parameters can reconfigure the receiver for receipt of subsequent transmissions.

BRIEF DESCRIPTION OF THE DRAWINGS

The invention will be more readily apparent to those skilled in the art by reference to the accompanying drawings wherein.

DETAILED DESCRIPTION OF THE PREFERRED EMBODIMENTS

This invention provides a system for adaptive mode control of an amplitude modulated compatible digital audio broadcast signal. Current commercial broadcast radio uses a fixed analog waveform format. In some cases, a receiver may change whether it detects stereophonic or monophonic information based on a quality assessment, but not as mandated by the transmitting station. Over the air signal adaptation and its incorporation into the commercial broadcast band is unprecedented.

Figure 1:
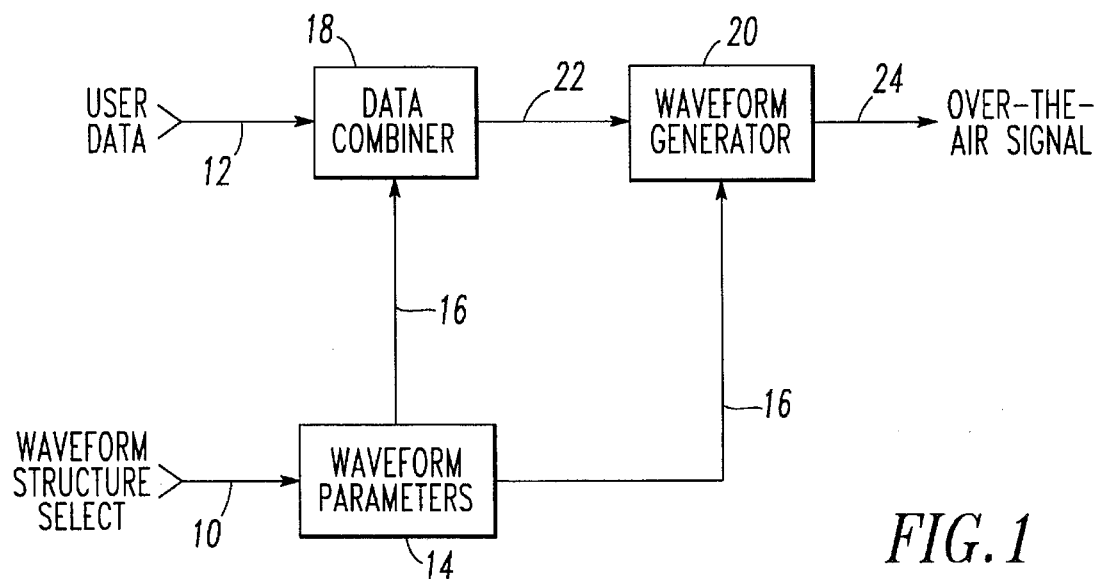
FIG. 1 is a block diagram of the adaptive mode control system provided in a transmitter constructed in accordance with this invention.
Figure 2:
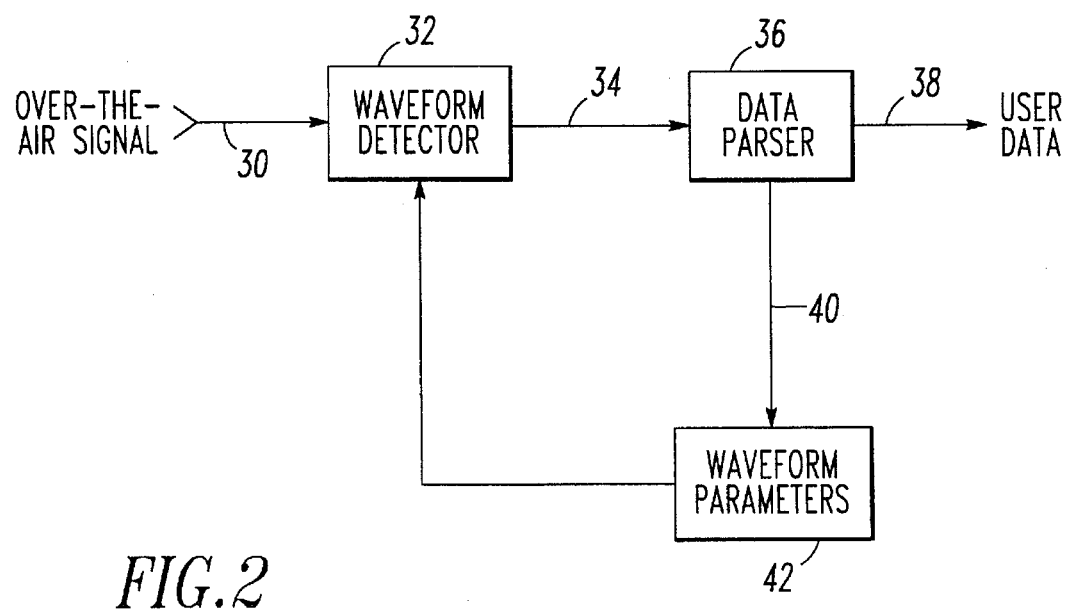
FIG. 2 is a block diagram of an adaptive mode control system for use in a receiver constructed in accordance with this invention.

There are several aspects of signalling architectures which may be altered to tailor the manner in which information is communicated between a transmitter and receiver. FIG. 1 factors out the key elements involved in adapting a waveform over a communication link in the transmitter. FIG. 2 factors out the key elements involved in adapting a waveform over a communication link in a receiver.

As shown in FIG. 1, on the transmitter side, a user provides desired format information 10, such as the waveform structure, and data 12 to the unit. Waveform parameters 14 are selected in response to the waveform structure 10 specified by the user. These waveform parameters 14 provide control channel information 16 to a data combiner 18 which aggregates user data 12 with control channel data 16. The control channel data 16 is also used in the form of component information to configure the waveform generator 20. The format information 10 supplied by the user is then impressed onto the waveform prior to transmission over-the-air. Waveform generator 20 combines the composite data 22 produced by data combiner 18 with the control channel information 16 to produce over-the-air signal 24.

As shown in FIG. 2, in the receiver section, the over-the-air information 30 arrives at the receiver and is detected by waveform detection means 32. Waveform detection means 32 detects the composite data 34 of over-the-air signal 30. Composite data 34 is processed by data parser 36 into user data 38 and control channel data 40. Control channel data 40 is processed to produce waveform parameters 42 which are folded back into waveform detector structure 32. Waveform parameters 42 modify the detection mechanism employed by waveform detection structure 32. Once modified, the receiver is thereby reconfigured for subsequent receptions of over-the-air signals 24 produced by the transmitter.

A key aspect of the implementation of the present invention is the reception of the control channel data by the receiver unit irrespective of the waveform alteration employed by the transmitter. Several strategies can be used. One preferred strategy is to provide a constant format service channel over which control information is sent. By providing such a constant format service channel, alterations made to the waveform while the receiver was in an inactive state will not affect reception by the receiver of the altered waveform signal.

In the foregoing specification certain preferred practices and embodiments of this invention have been set out, however, it will be understood that the invention may be otherwise embodied within the scope of the following claims.

We claim:

1. A system for adaptive mode control of an amplitude modulated compatible digital broadcast signal comprising:

(a) a transmitter having:

i) means for inputting format information regarding the waveform parameters of said amplitude modulated compatible digital broadcast signal;

ii) means for inputting user data;

iii) means for selecting said waveform parameters in response to said format information and producing control channel information;

iv) means for combining said user data and said control channel information to produce composite data; and v) means for generating an over-the-air signal waveform using said composite data and said waveform parameters; and b) at least one receiver having:

i) means for detecting said over-the-air signal waveform and said composite data produced by said transmitter;

ii) means for parsing said composite data into said user data and said control channel information;

iii) means for generating said waveform parameters from said control channel information; and iv) means for folding said waveform parameters into said means for detecting said over-the-air signal waveform, wherein said waveform parameters configure said receiver for receipt of subsequent transmissions.

2. The system of claim 1 further comprising a constant format service channel, whereby said control channel information is broadcast over a constant channel irrespective of any alterations made to said over-the-air signal waveform by said transmitter.

3. A method for adaptive mode control of an amplitude modulated compatible digital broadcast signal in a system having a transmitter and at least one receiver comprising the steps of:

(a) inputting format information regarding the waveform parameters of said amplitude modulated compatible digital broadcast signal in said transmitter;

(b) inputting user data in said transmitter;

(c) selecting said waveform parameters in response to said format information and producing control channel information in said transmitter;

(d) combining said user data and said control channel information to produce composite data in said transmitter; and (e) generating an over-the-air signal waveform using said composite data and said waveform parameters in said transmitter;

(f) detecting said over-the-air signal waveform and said composite data in said at least one receiver;

(g) parsing said composite data into said user data and said control channel information in said at least one receiver;

(h) regenerating said waveform parameters from said control channel information in said at least one receiver; and (i) folding said waveform parameters into detection means while detecting said over-the-air signal waveform in said at least one receiver, wherein said waveform parameters configure said receiver for receipt of subsequent transmissions.

4. The method of claim 3 further comprising the step of providing a constant format service channel, whereby said control channel information is broadcast over a constant channel irrespective of any alterations made to said over-the-air signal waveform by said transmitter.

5. A transmitter for use in a system for adaptive mode control of an amplitude modulated compatible digital broadcast signal comprising:

(a) means for inputting format information regarding the waveform parameters of said amplitude modulated compatible digital broadcast signal;

(b) means for inputting user data;

(c) means for selecting said waveform parameters in response to said format information and producing control channel information;

(d) means for combining said user data and said control channel information to produce composite data; and (e) means for generating an over-the-air signal waveform using said composite data and said waveform parameters.

6. The transmitter of claim 5 further comprising a constant format service channel, whereby said control channel information is broadcast over a constant channel irrespective of any alterations made to said over-the-air signal waveform by said transmitter.

7. A receiver for use in a system for adaptive mode control of an amplitude modulated compatible digital broadcast signal having a transmitter which transmits an over-the-air signal waveform and composite data, said composite data formed from user data and control channel information, comprising:

(a) means for detecting said over-the-air signal waveform and said composite data;

(b) means for parsing said composite data into said user data and said control channel information;

(c) means for regenerating said waveform parameters from said control channel information; and (d) means for folding said waveform parameters into said means for detecting said over-the-air signal waveform, wherein said waveform parameters configure said receiver for receipt of subsequent transmissions.

* * * * *